United States Patent
Roy et al.

(10) Patent No.: US 6,525,687 B2
(45) Date of Patent: Feb. 25, 2003

(54) LOCATION-DETERMINATION METHOD AND APPARATUS

(75) Inventors: Benjamin Van Roy, San Mateo, CA (US); John Tsitsiklis, Lexington, MA (US); Andrew Chou, San Mateo, CA (US)

(73) Assignee: Enuvis, Inc., South San Francisco (*) Notice: Subject to any disclaimer, the term of this patent is extended or adjusted under 35 U.S.C. 154(b) by 0 days.

(21) Appl. No.: 09/782,648

(22) Filed: Feb. 12, 2001

(65) Prior Publication Data

US 2002/0145557 A1 Oct. 10, 2002

(51) Int. Cl.[7] .............................................. H04B 7/185
(52) U.S. Cl. ............................ 342/357.06; 342/357.01; 701/213
(58) Field of Search ....................... 342/357.01, 357.02, 342/357.06, 357.07; 701/213, 215

(56) References Cited

U.S. PATENT DOCUMENTS 5,884,215 A * 3/1999 Birchler et al. ............. 701/207
5,926,761 A * 7/1999 Reed et al. .................. 455/440
5,940,035 A * 8/1999 Hedrick ...................... 342/462

* cited by examiner

Primary Examiner—Dao Phan
(74) Attorney, Agent, or Firm—Edward C. Kwok, Esq.

(57) ABSTRACT

Some embodiments of the invention provide a location-determination system that includes a number of transmitters and at least one receiver. Based on a reference signal received by the receiver, this location-determination system identifies an estimated location of the receiver within a region. In some embodiments, the system selects one or more locations within the region. For each particular selected location, the system calculates a metric value that quantifies the similarity between the received signal and the signal that the receiver could expect to receive at the particular location, in the absence or presence of interference. Based on the calculated metric value or values, the system identifies the estimated location of the receiver.

32 Claims, 10 Drawing Sheets

LOCATION-DETERMINATION METHOD AND APPARATUS

BACKGROUND OF THE INVENTION

In many applications, it is necessary to estimate the location of objects in their environment. To date, numerous location-determination systems have been proposed for this task. One such system is the global positioning system (GPS). This system includes a number of satellites that orbit the Earth. It also includes GPS receivers, monitoring stations, and differential GPS receivers on Earth.

GPS satellites transmit signals from which GPS receivers can estimate their locations on Earth. A GPS satellite signal typically includes a composition of: (1) carrier signals, (2) pseudorandom noise (PRN) codes, and (3) navigation data. GPS satellites transmit at two carrier frequencies. The first carrier frequency is approximately 1575.42 MHz, while the second is approximately 1227.60 MHz. The second carrier frequency is predominantly used for military applications.

Each satellite uses two PRN codes to modulate the first carrier signal. The first code is a coarse acquisition (C/A) code, which repeats every 1023 bits and modulates at a 1 MHz rate. The second code is a precise (P) code, which repeats on a seven-day cycle and modulates at a 10 MHz rate. Different PRN codes are assigned to different satellites in order to distinguish GPS signals transmitted by different satellites.

The navigation data is superimposed on the first carrier signal and the PRN codes. The navigation data is transmitted as a sequence of frames. This data specifies the time the satellite transmitted the current navigation sequence. The navigation data also provides information about the satellite's clock errors, the satellite's orbit (i.e., ephemeris data) and other system status data. A GPS satellite receives its ephemeris data from monitoring stations that monitor ephemeris errors in its altitude, position, and speed.

Based on the signals transmitted by the GPS satellites, current GPS techniques typically estimate the location of a GPS receiver by using a triangulation method. This method typically requires the acquisition and tracking of at least four satellite signals at the 1.57542 GHz frequency.

Traditional GPS acquisition techniques try to identify strong satellite signals by performing IQ correlation calculations between the GPS signal received by a GPS receiver and the C/A code of each satellite, at various code phases and Doppler-shift frequencies. For each satellite, the acquisition technique records the largest-calculated IQ value as well as the code phase and Doppler-shift frequency resulting in this value. After the IQ calculations, traditional acquisition techniques select at least four satellites that resulted in the highest-recorded IQ values for tracking at the code phases and Doppler values associated with the recorded IQ values.

After signal acquisition, a signal tracking method extracts navigation data transmitted by each selected satellite to estimate the selected-satellite's pseudorange, which is the distance between the receiver and the selected satellite. As mentioned above, each tracked satellite's navigation data specifies the satellite's transmission time. Consequently, a satellite-signal's transmission delay (i.e., the time for the signal to travel from the satellite to the receiver) can be calculated by subtracting the satellite's transmission time from the time the receiver received the satellite's signal. In turn, the distance between the receiver and a selected satellite (i.e., a selected satellite's pseudorange) can be computed by multiplying the selected satellite's transmission delay by the speed of light.

Traditional triangulation techniques compute the location of the GPS receiver based on the pseudoranges and locations of the selected satellites. These techniques can compute the location of each selected satellite from the ephemeris data. Theoretically, triangulation requires the computation of pseudoranges and locations of only three satellites. However, GPS systems often calculate the pseudorange and location of a fourth satellite because of inaccuracies in time measurement.

Some GPS systems also improve their accuracy by using a differential GPS technique. This technique requires the operation of differential GPS receivers at known locations. Unlike regular GPS receivers that use timing signals to calculate their positions, the differential GPS receivers use their known locations to calculate timing errors due to the signal transmission path. These differential GPS receivers determine what the travel time of the GPS signals should be, and compare them with what they actually are. Based on these comparisons, the differential GPS receivers generate "error correction" factors, which they relay to nearby GPS receivers. The GPS receivers then factor these errors into their calculation of the transmission delay.

Prior GPS techniques have a number of disadvantages. For instance, to perform their triangulation calculations, these techniques typically require acquisition of signals from four satellites. However, it is not always possible to acquire four satellite signals in certain locations. For example, inside structures or under foliage, the satellite signals can attenuate to levels that are not detectable by traditional signal-acquisition techniques.

Also, traditional techniques detect the code phases of the GPS satellites in a decoupled manner (i.e., they detect the code phase of each satellite individually). This approach also considers many code phase candidates that are impossible. In addition, this approach does not discount spurious peaks in correlations due to inter-satellite interference. Such interference is especially problematic when some of the satellite signals are greatly attenuated and others are not.

Therefore, there is a need for a global positioning system with improved sensitivity, which can operate in environments that cause high signal attenuation. There is further a need for a global positioning system that discounts spurious peaks in correlations due to inter-satellite interference. In addition, there is a need for a global positioning system that can perform its position-detection operation with a relatively small amount of data. More generally, there is a need for a location-determination system that addresses some or all of the above-mentioned needs.

SUMMARY OF THE INVENTION

Some embodiments of the invention provide a location-determination system that includes a number of transmitters and at least one receiver. Based on a reference signal received by the receiver, this location-determination system identifies an estimated location of the receiver within a region. In some embodiments, the system selects one or more locations within the region. For each particular selected location, the system calculates a metric value that quantifies the similarity between the received signal and the signal that the receiver could expect to receive at the particular location, in the absence or presence of interference. Based on the calculated metric value or values, the system then identifies the estimated location of the receiver.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
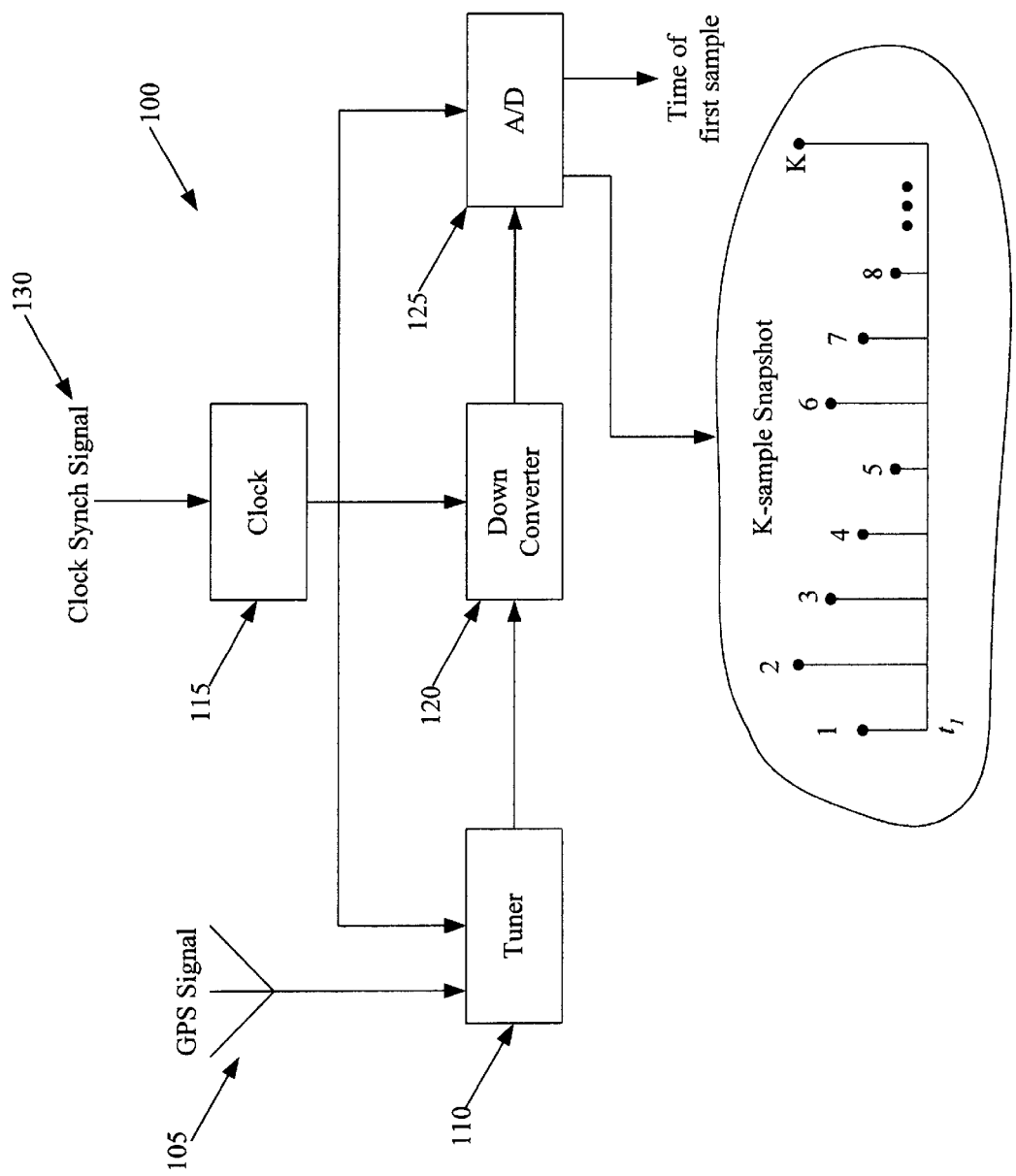
FIG. 1 illustrates a signal processing circuit that receives a GPS signal and generates a digital snapshot of this GPS signal.

The invention provides a location-determination method and apparatus. In the following description, numerous details are set forth for purpose of explanation. However, one of ordinary skill in the art will realize that the invention may be practiced without the use of these specific details. For instance, some embodiments of the invention are described below by reference to global positioning systems. One of ordinary skill will understand that other embodiments of the invention are used in other types of location-determination systems. In other instances, well-known structures and devices are shown in block diagram form in order not to obscure the description of the invention with unnecessary detail.

Some embodiments of the invention are location determination systems that determine location of receivers from "reference signals" received by the receivers. As used in this document, a reference signal means any type of signal from which location information may be derived. Hence, the reference signal can be a GPS ("global positioning system") signal, a CDMA ("code division multiple access") signal, a GSM ("global system for mobile communication") signal, a TDMA ("time division multiple access") signal, a CDPD ("cellular digital packet data") signal, or any other signal from which location information may be derived.

In the embodiments described below, however, the reference signal is a GPS signal that can be used to estimate the location of GPS receivers. On Earth, a GPS receiver typically receives a GPS signal that is a composite of several signals transmitted by GPS satellites that orbit the Earth. The characteristics of such GPS-satellite signals were described above in the background section.

Some embodiments estimate the location of a GPS receiver by (1) initially digitizing the reference GPS signal received by the receiver, and then (2) using the digitized GPS reference data to estimate the location of the GPS receiver. The GPS receiver typically performs the digitization operation. Also, in some embodiments, the GPS receiver digitizes only a portion of the received GPS signal to obtain a digital "snapshot" of this signal. An example of a signal-processing circuit that a GPS receiver can use to generate such a digital snapshot will be described below by reference to FIG. 1.

Some embodiments use location-determination processes to estimate the location of the GPS receiver from the digitized GPS reference data. In some embodiments, the location-determination process selects a number of locations within a region that contains the GPS receiver. For each particular selected location, this process then calculates a metric value that quantifies the similarity between the GPS reference data and samples of the signal that the receiver would be expected to receive at the particular location. Based on these calculations, the process identifies an estimated location of the GPS receiver.

In certain circumstances, the estimated receiver location matches the exact receiver location. In other circumstances, the estimated receiver location matches the exact receiver location to such a high degree of accuracy that it is indistinguishable from the exact location to an observer. In yet other situations, however, the estimated location differs from the actual location of the GPS receiver by a certain error amount; in these situations, some embodiments take steps to ensure that this error (between the estimated and actual receiver locations) is tolerable for the particular location-determination application. Several more specific location-determination processes will be explained by reference to FIGS. 2–12.

These location-determination processes can be performed either (1) completely by the GPS receiver, (2) completely by another device or computer in communication with the GPS receiver, or (3) partially by the GPS receiver and partially by another device or computer in communication with the GPS receiver.

The GPS receiver can be a standalone device, can be part of another mobile device (e.g., a personal digital assistant ("PDA"), wireless telephone, etc.), or can communicatively connect to another mobile device (e.g., connect to a Handspring Visor PDA through its proprietary Springboard). Several such architectures for the GPS receiver are described in United States Patent Application, entitled "Method and Apparatus for Determining Location Using a Thin-Client Device," filed on Dec. 4, 2000, and having Ser. No. 09/730,324. The disclosure of this application (i.e., United Stated Patent Application, entitled "Method and Apparatus for Determining Location Using a Thin-Client Device," filed on Dec. 4, 2000, and having Ser. No. 09/730,324) is incorporated herein by reference.

I. Generating the Digital Reference Data

FIG. 1 illustrates a signal processing circuit 100 that receives a GPS signal and generates a digital snapshot of this GPS signal. As shown in this figure, the signal processing circuit 100 includes a GPS antenna 105, a GPS tuner 110, a clock 115, a down-converter 120, and an analog to digital ("A/D") converter 125.

The GPS antenna 105 receives a GPS signal $\bar{x}(t)$, which on Earth is a composite of noise and several signals transmitted by several GPS satellites that orbit the Earth. The antenna 105 and its associated circuitry are configured to receive the reference GPS signal $\bar{x}(t)$ at a GPS carrier frequency, which currently is around 1.57 gigahertz ("Ghz"). The RF tuner 110 receives the GPS signal $\bar{x}(t)$ from the antenna 105. This tuner 110 is tuned to capture signals at the approximate frequency of the GPS signal. Hence, the tuner captures the GPS reference signal $\bar{x}(t)$ received by the antenna 105.

The RF tuner communicatively couples to the clock 115 to receive a clock signal. The clock 115 generates one or more clock signals to synchronize the operation of the components of the signal-processing circuit 100. This clock also receives a synchronizing clock signal 130. This synchronizing signal allows the clock to set initially its internal time, and to try to synchronize its clock signals with the GPS clock. The clock 115 can receive the synchronizing signal 130 from a variety of sources. For instance, in some embodiments, the signal-processing circuit 100 includes an RF processing circuit that (1) captures a radio signal with the synchronizing signal, and (2) supplies this signal to the clock 115.

In some embodiments, the clock's signals are synchronized with the GPS clock. However, in the embodiments described below, the received clock synch signal 130 does not synchronize the clock's signals with the GPS clock. In these embodiments, the receiver's clock might be a few micro- or milli-seconds off the GPS clock. The degree of the receiver clock's inaccuracy will depend on (1) where and how the synchronizing signal 130 is obtained, and (2) how accurately the source of the synchronizing signal maintains its time.

As shown in FIG. 1, the down converter 120 receives the tuner's output (i.e., receives the captured GPS reference signal $\bar{x}(t)$). The down converter 120 transforms the captured GPS reference signal to an intermediate frequency ("IF") reference signal $\bar{x}(t)$. To do this, the down converter includes in some embodiments an IF mixer that converts the frequency of the captured GPS signal to an IF frequency, such as 50 Mhz. In some embodiments, the down converter also includes one or more band pass and amplification stages to filter and amplify the input and/or output of the IF mixer.

The signal-processing circuit 100 utilizes a down converter so that the A/D converter 125 can sample the reference signal at an intermediate frequency as opposed to a radio frequency. One of ordinary skill will understand that other embodiments can include more than one down converter in their signal-processing circuits. Also, some embodiments use one or more down converters to convert the GPS reference signal to a baseband reference signal, which can then be sampled by the A/D converter.

In some embodiments, the A/D converter's sampling rate is at least twice the size of the frequency band, while in other embodiments the sampling rate is less than this minimum amount. The A/D converter 125 samples the IF reference GPS signal $\bar{x}(t)$ that it receives from the down converter 120, and outputs an K-sample digital snapshot of the IF GPS signal $\bar{x}(t)$. This digital snapshot is only a portion of the received GPS signal. This snapshot serves as digital GPS reference data $x_1, \ldots, x_K$ that the location determination processes described below can use. The A/D converter also outputs the time $\tilde{t}_1$ when it generated the first sample in the digital snapshot.

In this document, a "tilde" is generally placed over a variable to indicate that the value of the variable is an approximation of the actual value of the item represented by the variable. Thus, the variable $\tilde{t}_1$ has a "tilde" over it to indicate that it represents the approximate time for when the first sample was generated. This time is the approximate time because it is measured according to the receiver's clock, which is not completely synchronized with the GPS time in the embodiments described below. As the first-sample time $\tilde{t}_1$ is not accurate according to the GPS time, the location-determination processes will have to account for this inaccuracy in estimating the location of the GPS receiver.

II. Estimating the Location of the GPS Receiver

Figure 2:
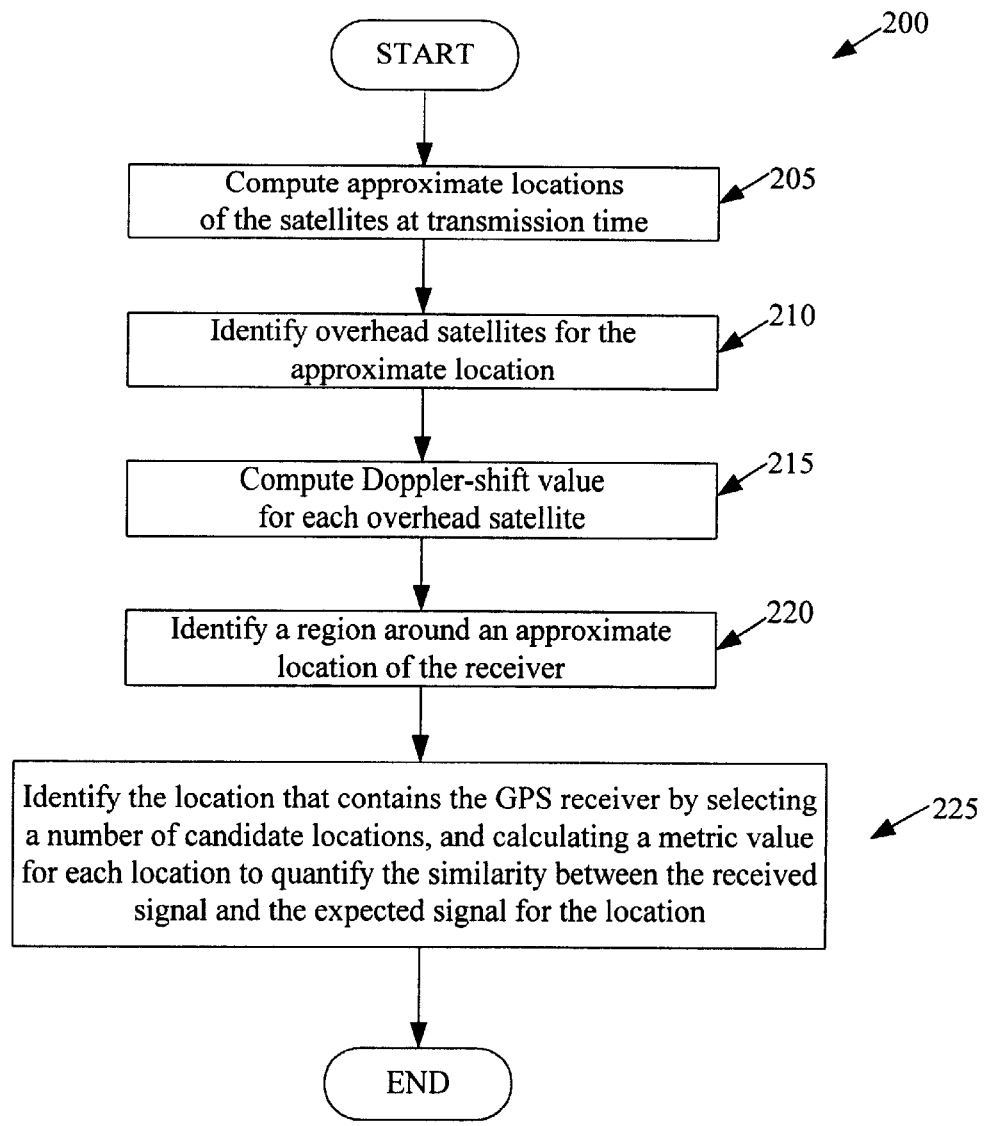
FIG. 2 illustrates a process that estimates the location of the GPS receiver from the digital snapshot generated by the signal-processing circuit.

FIG. 2 illustrates a process 200 that estimates the location of the GPS receiver from the digital snapshot generated by the signal-processing circuit 100. In the embodiments described below, a location-determination server separate from the GPS receiver performs this process 200. One of ordinary skill will also realize that in other embodiments, the process 200 is performed either (1) completely by the GPS receiver, or (2) partially by the GPS receiver and partially by another device or computer (e.g., a location-determination server) in communication with the GPS receiver.

Figure 3:
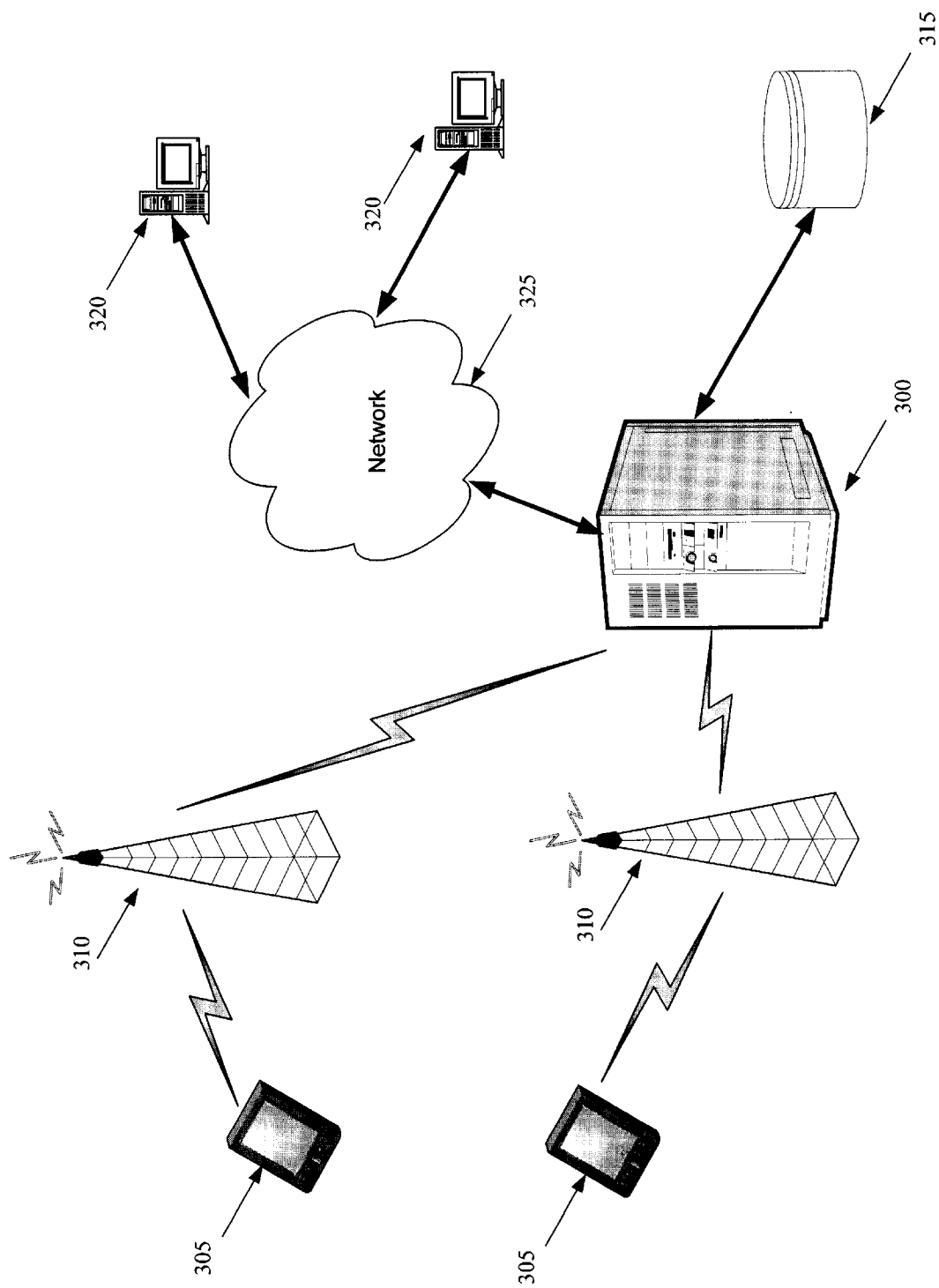
FIG. 3 illustrates a location-determination system.

FIG. 3 illustrates a location-determination server 300 that performs the process 200. In some embodiments, this server is just one computer, while in other embodiments several computers form this server. In some embodiments, these several computers may be geographically distributed. This server can be a standalone device or it can be part of other devices.

As shown in FIG. 3, the location-determination server 300 receives digital GPS reference data $x_1, \ldots, x_K$ from GPS receivers 305 through one or more base stations 310. Each base station detects GPS-receiver signal transmissions within a particular region, and relays this information to the location-determination server. One of ordinary skill will realize that the base station can use a variety of communication architectures and networks to relay the signals from the GPS receivers to the location-determination server.

The location-determination server 300 performs the process 200 for a particular GPS receiver whenever it receives the digital GPS reference data $x_1, \ldots, x_K$ from the particular GPS receiver. In addition to the receiver's reference GPS data, the server 300 uses several other data items to perform process 200, in some embodiments of the invention. For instance, in some embodiments, the server 300 considers the Doppler-shift introduced by the receiver clock's drift DC and the time of the first sample $t_1$ according to the GPS clock.

Also, in some embodiments, the server uses an approximate location $\tilde{l}$ the GPS receiver. Different embodiments specify the approximate location differently. In the embodiments described below, the approximate location is the location of the base station that relays the GPS reference data generated by the receiver. This approximate-location information can be part of the signal forwarded by the base station. Alternatively, the server 300 can use the base-station's identification to retrieve the base-station location information from a storage structure (such as database 315 of FIG. 3) that stores the location of all base stations.

One of ordinary skill will realize that other embodiments specify the approximate location differently. For instance, the approximate location can be specified as a location within a specific sector in a region covered by a base station. Alternatively, the approximate location can be defined as the GPS-receiver's previous location that was recorded within a predetermined time interval of the current first-sample time.

In addition, in some embodiments, the data-processing server needs to have access to navigation bits, ephemeris data, differential GPS data, and clock-correction data for each GPS satellite. The server can receive this information from a variety of sources. For instance, as shown in FIG. 3, the server can receive this information from one or more reference GPS receivers 320 through one or more communication networks 325, such as the Internet.

To perform the process 200 for a particular GPS receiver, the location-determination server 300 initially computes (at 205) the approximate location of all GPS satellites at the time that these satellites transmitted the signals resulting in the first sample $x_1$ of the GPS reference data. This computation is further described below by reference to FIG. 4.

The process next identifies (at 210) the GPS satellites that are over the approximate location $\tilde{l}$ of the GPS receiver. This identification is further described below by reference to FIGS. 5 and 6. After identifying the overhead satellites for the approximate location $\tilde{l}$, the process 200 computes (at 215) the Doppler-shift value for each overhead satellite. This computation is further described below by reference to FIGS. 7 and 8.

The process then identifies (at 220) a region around the approximate location 7. As further described below, the process searches through this region to estimate the location of the GPS receiver. The identification of the region is further described below by reference to FIGS. 9–11.

Once the region has been identified, the process 200 identifies (at 225) the location that contains the GPS receiver in this region. This identification will be further described below by reference to FIG. 12. In some embodiments, this identification process generally entails (1) selecting a number of candidate locations within the region, (2) for each particular selected location, calculating a metric value that quantifies the similarity between the GPS reference data and samples of the signal that the receiver would be expected to receive at the particular location, and (3) estimating the location of the GPS receiver based on these calculations.

Some embodiments select candidate locations by using a partitioning grid to identify a number of candidate locations within the region and then selecting some or all of the identified candidate locations. Some embodiments increase the speed of the location-determination process by selecting only some of the identified candidate locations for the metric computations. Also, different embodiments partition the region with different levels of granularity. Some use coarser partitioning grids than others.

After computing the metric values for the selected candidate locations, some embodiments identify the selected location that resulted in the best calculated metric value as the location of the GPS receiver. After computing these values and identifying the location resulting in the best value (i.e., the best initial location), other embodiments use a finer grid around the best initial location to specify a number of additional candidate locations around this location. These embodiments then calculate metric values for some or all of the specified additional candidate locations. These embodiments next either (1) select the additional candidate location that resulted in the best metric value as the location of the GPS receiver, or (2) repeat the process recursively with finer grids to improve the accuracy of the estimated GPS-receiver location.

After computing the metric values for the selected candidate locations, other embodiments might estimate a more accurate GPS-receiver location around the identified location by using an analytical technique. Specifically, some embodiments might identify the selected locations that resulted in the best calculated metric values, and then use an analytical technique (e.g., an interpolative technique) to compute the location of the receiver from the identified selected locations.

A. Computation of Satellite Locations

As mentioned above, the location-determination process 200 initially computes the approximate locations of the satellites at the time that these satellites transmitted the signals that resulted in the first sample in the generated digital snapshot. The receiver generated this first sample at time $\tilde{t}_1$.

Given ephemeris and differential data, a satellite's location s(t) is for all practical purposes a deterministic function of the GPS time t. One set of equations for deriving a satellite's location from ephemeris and differential data is provided in Table 2.3 on page 38 of "Understanding GPS Principles and Applications," by Elliott Kaplan, Artech House, 1996.

To compute the location of a satellite i, the process 200 needs to first compute the approximate time that the satellite i transmitted the signal resulting in the first sample. The process computes an approximate transmission time because the exact transmission time is difficult to compute.

The exact transmission time for each satellite i equals the actual time $t_1$ of the first sample minus the actual signal-transit delay $\tau_i$ for the satellite. The signal-transit delay $\tau_i$ is the time between the satellite's transmission of its signal and the receiver's generation of the first sample. Equation (1) specifies a function H that computes the exact signal transit delay $\tau_i$ of a satellite i.

$$\tau_i = H(l, s_i(t_l - \tau_i)) = \frac{\|l - s_i(t_l - \tau_i)\|}{c} + \tau_i^a + \tau^r \qquad (1)$$

In this equation, l is the receiver's exact position at reception time $t_1$, $s_i(t_1-\tau_i)$ is the satellite's precise location at exact transmission time $(t_1-\tau_i)$, c is the speed of light, $\tau_i^a$ is delay due to atmospheric conditions, $\tau^r$ is delay caused by analog processing at the receiver.

The location-determination process 200 can determine atmospheric-delay $\tau_i^a$ by using differential data. It can also retrieve from a storage structure the processing-delay $\tau^r$ associated with each GPS receiver. However, it is difficult to ascertain (1) the exact time of the first sample $t_1$, (2) the receiver's precise location l at exact time $t_1$ of the first sample, or (3) the satellite's precise location $s_i(t_1-\tau_i)$ at precise transmission time $(t_1-\tau_i)$. Hence, it is difficult to solve the Equation (1) to obtain an exact value for the signal-transit delay $\tau_i$.

Therefore, in some embodiments, the location-determination process 200 (at 205) computes for each satellite i the approximate signal transit delay $\tau_i$ of the satellite. Equation (2) below illustrates one manner of computing an approximate signal-transit delay $\tau_i$. This equation assumes that (1) the first-sample time is $\tilde{t}_1$, (2) the receiver is located at the approximate location $\tilde{l}$, and (3) the satellite's location at transmission time equals its location at the approximate time $\tilde{t}_1$ of the first sample.

$$\tilde{\tau}_i = H(\tilde{l}, s_i(\tilde{t}_1)) = \frac{\|\tilde{l} - s_i(\tilde{t}_1)\|}{c} + \tau_i^a + \tau^r \qquad (2)$$

Some embodiments (1) use the base-station tower location as the approximate location $\tilde{l}$ of the GPS receiver, and (2) define position vectors $\tilde{l}$ and $s_i(\tilde{t}_1)$ by using an Earth-centered Earth-fixed coordinate system. Also, some embodiments retrieve the tower location from a database by using the received cell tower identification.

For each satellite i, this process can thus compute an approximate transmission time $(\tilde{t}_1-\tau_i)$ based on the approximate first-sample time $\tilde{t}_1$ and the satellite's approximated signal-transit delay $\tau_i$. Accordingly, for each satellite i, the process computes the satellite's approximate location $s_i(\tilde{t}_1-\tau_i)$ at the computed approximate transmission time $(\tilde{t}_1-\tau_i)$, by using the ephemeris and differential data. As mentioned above, one set of equations for deriving a satellite's location given ephemeris and differential data are provided in Table 2.3 on page 38 of "Understanding GPS Principles and Applications," by Elliott Kaplan, Artech House, 1996.

It can be shown that the approximate satellite location that is computed under this approach is no more than few meters off from the true satellite location at the time of transmission. In the remainder of this document, the symbol $s_i$ is used as shorthand for the approximate satellite location $s_i(\tilde{t}_1-\tau_i)$.

Figure 4:
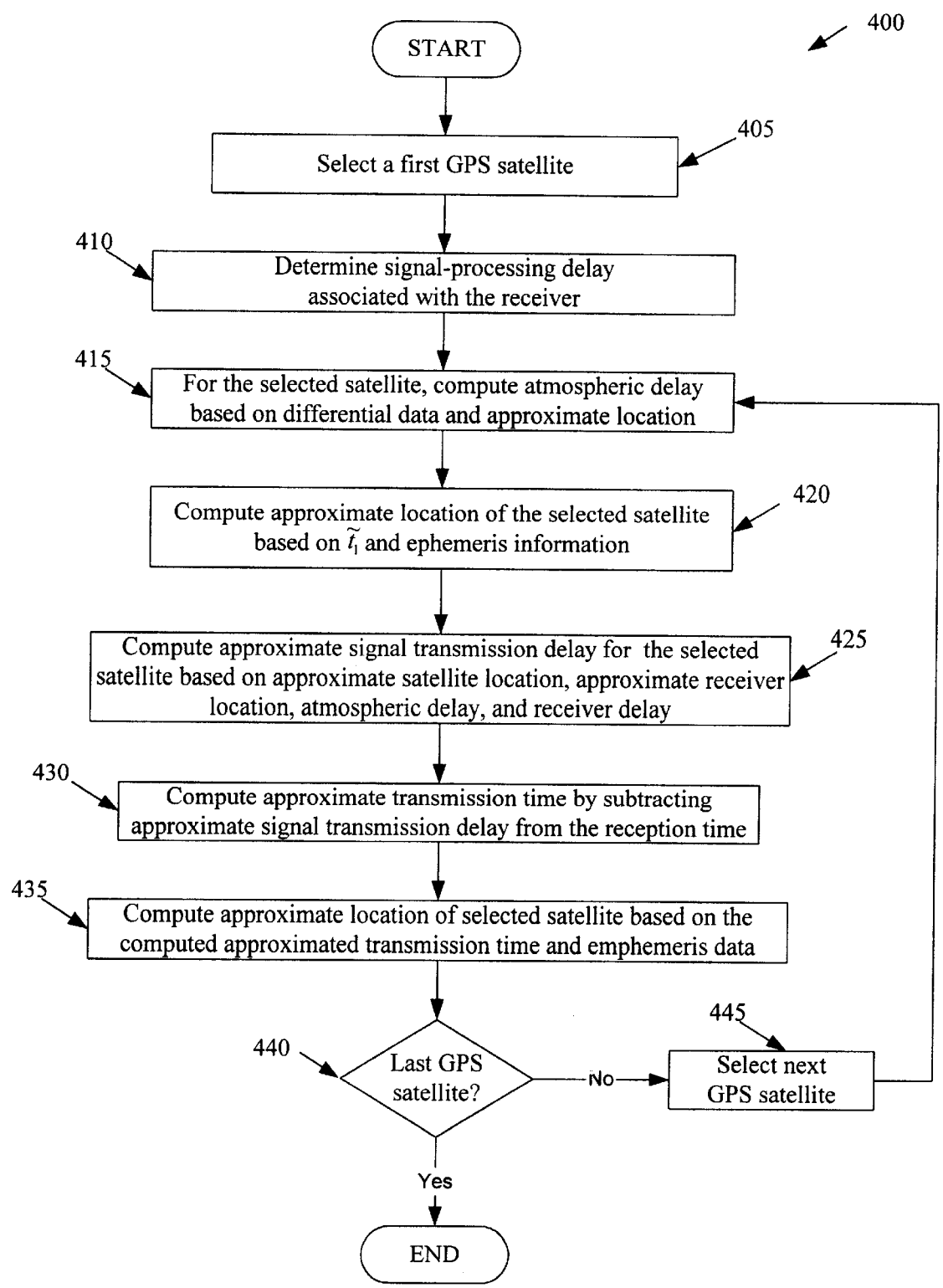
FIG. 4 illustrates a process that calculates the approximate location of GPS satellites at a particular transmission time.

FIG. 4 illustrates a process 400 that uses the above-described approach to calculate the approximate location of each GPS satellite i at the approximate time $(\tilde{t}_1-\tau_i)$ that the satellite transmitted the signal resulting in the first generated sample. This process is used by process 200 at 205, in some embodiments of the invention.

As shown in FIG. 4, the process 400 initially selects (at 405) a first GPS satellite i from a list of GPS satellites that it has. The process then determines (at 410) the signal-processing delay $\tau^r$ associate with receiver. Some embodiments store in a storage structure the processing-delay $\tau^r$ associated with each GPS receiver that can be used with the process 200 and the location-determination server 300. Hence, in these embodiments, the process 400 retrieves from the storage structure the processing-delay $\tau^r$ associated with the particular GPS receiver at issue.

Next, for the selected satellite, the process computes (at 415) the atmospheric delay $\tau_i^a$. This atmospheric delay can be derived from the received differential GPS data and the approximate receiver location $\tilde{l}$. One manner for deriving atmospheric delay at a location from received differential GPS data is disclosed in Chapter 8 of "Understanding GPS Principles and Applications," by Elliott Kaplan, Artech House, 1996.

At 420, the process then computes the selected satellite's approximate location $s_i(\tilde{t}_1)$ at the time $\tilde{t}_1$ that the receiver generated the first sample. In some embodiments, the process computes this location at the time $\tilde{t}_1$ from the ephemeris and differential data by using the set of equations provided in Table 2.3 on page 38 of "Understanding GPS Principles and Applications," by Elliott Kaplan, Artech House, 1996.

After computing the approximate location of the satellite at time $\tilde{t}_1$, the process 400 computes (at 425) the approximate signal-transit delay $\tau_i$, of the selected satellite. This process uses the above-described Equation (2) to compute the approximate signal-transit delay $\tau_i$ from the approximate satellite location $s_i(\tilde{t}_1)$ (computed at 420), the signal-processing and atmospheric delays $\tau^r$ and $\tau_i^a$ (respectively computed at 410 and 415), and the approximate receiver location $\tilde{l}$.

Next, the process computes (at 430) the approximate transmission time $(\tilde{t}_1-\tau_i)$ for the selected satellite by subtracting the approximate signal-transit delay $\tau_i$ (computed at 425) from the approximate first-sample time $\tilde{t}_1$. The process then computes (at 440) the selected satellite's location $s_i(\tilde{t}_1-\tau_i)$ at the approximate transmission time $(\tilde{t}_1-\tau_i)$ computed at 435. In some embodiments, the process computes this location from the ephemeris and differential data by using the set of equations provided in Table 2.3 on page 38 of "Understanding GPS Principles and Applications," by Elliott Kaplan, Artech House, 1996.

After computing the selected satellite's location at the approximate transmission time, the process determines (at 440) whether the selected satellite is the last GPS satellite on its GPS-satellite list. If not, the process selects (at 445) another GPS satellite from this list, and repeats 415 to 435 in order to determine this newly-selected satellite's approximate location. Otherwise, the process determines that it has computed location of all the GPS satellites at the approximate time they transmitted their signals that resulted in the first generated sample. Hence, the process ends.

B. Identification of Overhead Satellites

After identifying the location of all the GPS satellites, the process 200 identifies (at 210) the satellites that are currently "overhead." In some embodiments, the process 200 identifies the "overhead" satellites by making a simplifying assumption that satellites are overhead relative to the handset if and only if they are overhead relative to the approximate location $\tilde{l}$.

Hence, in these embodiments, the process 200 examines each satellite i and determines whether the satellite is over the approximate location $\tilde{l}$. In some embodiments, the process specifies a satellite i as an overhead satellite if and only if $\tilde{l} \cdot \tilde{l} \leq \tilde{l} \cdot s_i$. In other words, the process designates the satellite i as an overhead satellite if and only if the inner product of the satellite's approximate position vector $s_i$ with the approximate location vector $\tilde{l}$ is greater than or equal to the inner product of the approximate location vector with itself.

This designation criterion essentially determines whether the magnitude of the projection of a satellite's approximate position vector $s_i$ onto the approximate location vector $\tilde{l}$ is greater than or equal to the magnitude of the approximate location vector $\tilde{l}$. If so, the satellite is an overhead satellite.

Figure 5:
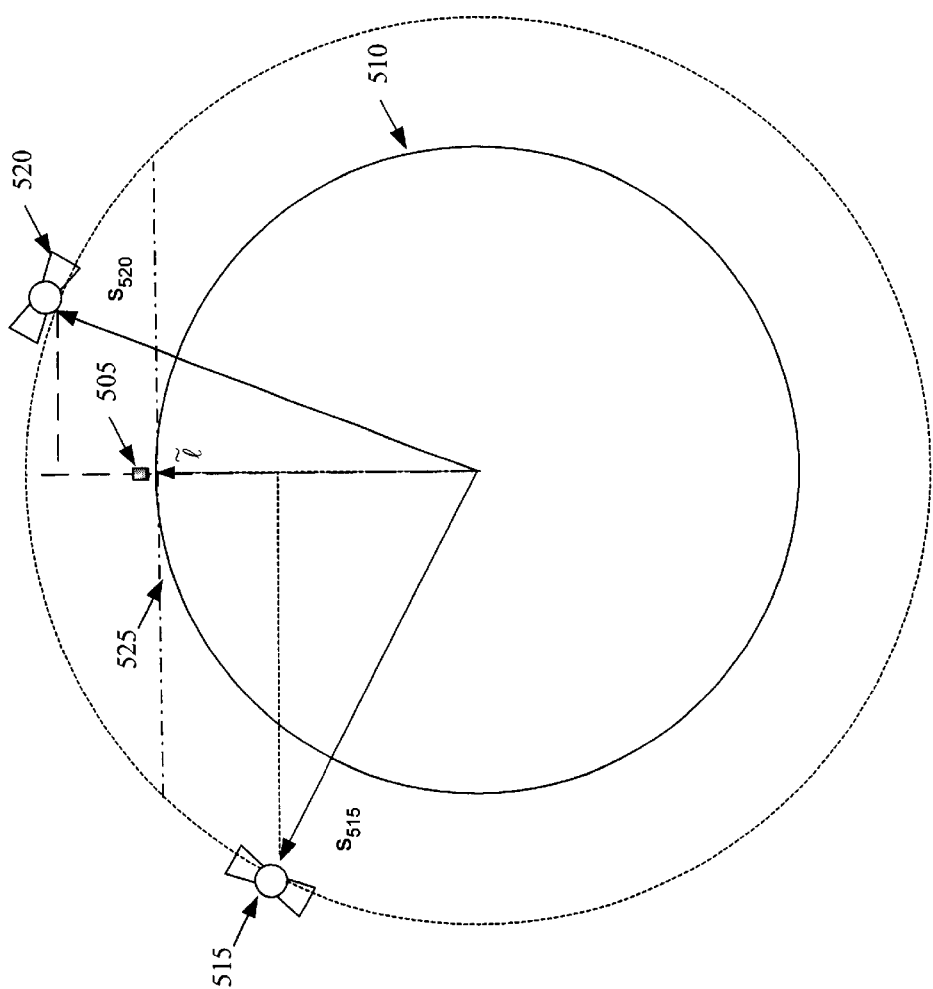
FIG. 5 illustrates one satellite that is "over" an approximate location and another satellite that is not "over" the approximate location.

FIG. 5 pictorially illustrates this designation criterion. This figure presents a GPS receiver 505 at the approximate location $\tilde{l}$ on Earth 510, and two satellites 515 and 520 that orbit the Earth. The satellite 515 is not an overhead satellite as it is beneath the horizon 525 of the location $\tilde{l}$. Accordingly, the magnitude of the projection of its position vector $s_{515}$ onto the approximate location vector $\tilde{l}$ is less than the magnitude of the approximate location vector $\tilde{l}$.

On the other hand, the satellite 520 is an overhead satellite as it is above the horizon 525 of the location $\tilde{l}$. Hence, the magnitude of the projection of its position vector $s_{520}$ onto the approximate location vector $\tilde{l}$ is greater than the magnitude of the approximate location vector $\tilde{l}$.

Figure 6:
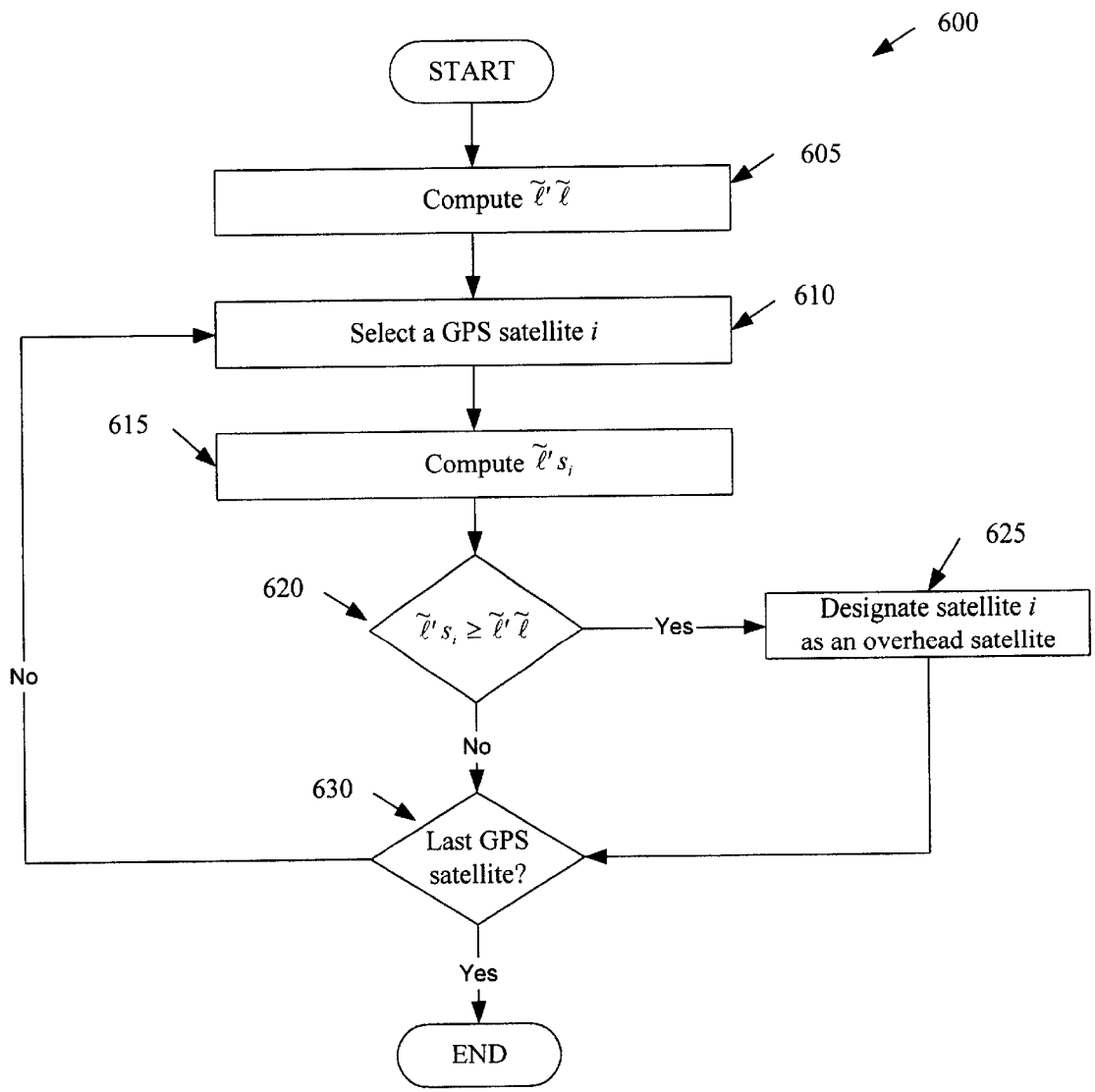
FIG. 6 illustrates a process that identifies satellites that are over an approximate location.

FIG. 6 illustrates a process 600 that uses the above-described approach to identify the overhead satellites. This process is used by process 200 at 210, in some embodiments of the invention. As shown in FIG. 6, the process 600 initially computes (at 605) the inner product of the approximate location vector $\tilde{l}$ with itself.

The process 600 next selects (at 610) a GPS satellite from a list of GPS satellites that it has. The process then computes (at 615) the inner product of the approximate location vector $\tilde{l}$ with the selected satellite's approximate location vector $s_i$, which was computed at 205.

At 620, the process 600 determines whether the inner product generated at 615 is greater or equal to the inner product generated at 605. If not, the process transitions to 630, which will be described below. Otherwise, the process designates (at 625) the satellite selected at 610 as an overhead satellite, and then transitions to 630.

At 630, the process determines whether it has examined all the GPS satellites on its list of GPS satellites. If not, the process returns to 610 to select another GPS satellite from this list, and repeats the above-described operations in order to determine whether the newly-selected satellite is an overhead satellite or not.

Once the process determines (at 630) that it has examined all the GPS satellites, the process ends. Typically, by the time that the process 600 ends, this process has identified some integer number N of the GPS satellites as overhead satellites. In the discussion below, these designated overhead satellites are indexed by integers 1 through N.

C. Computation of Satellite Dopplers

Figure 7:
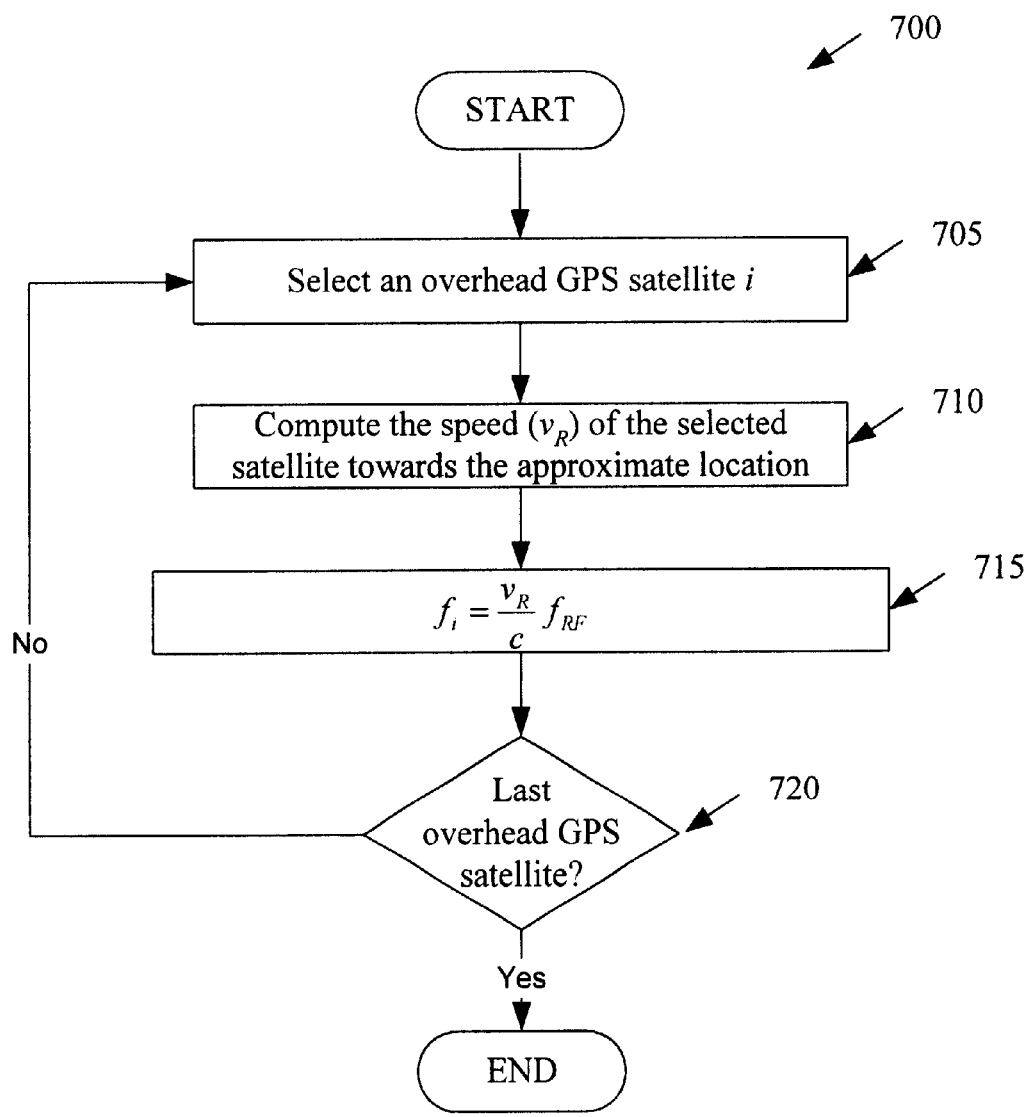
FIG. 7 illustrates a process that computes Doppler-shift values due to the motion of the satellites.

After identifying the overhead satellites, the process 200 computes (at 215) the additive Doppler-shift value for each overhead satellite. FIG. 7 illustrates a process 700 used by the process 200 in some embodiments to compute these Doppler-shift values. As shown in FIG. 7, the process 700 initially starts by selecting (at 705) one of the overhead GPS satellites identified at 210.

The additive Doppler-shift value $f_i$ for a satellite depends on the satellite's speed towards the location of the GPS handset. Hence, the process 700 computes (at 710) the speed of the selected overhead satellite towards the approximate location $\hat{l}$. This speed is a component of the satellite's overall speed.

Figure 8:
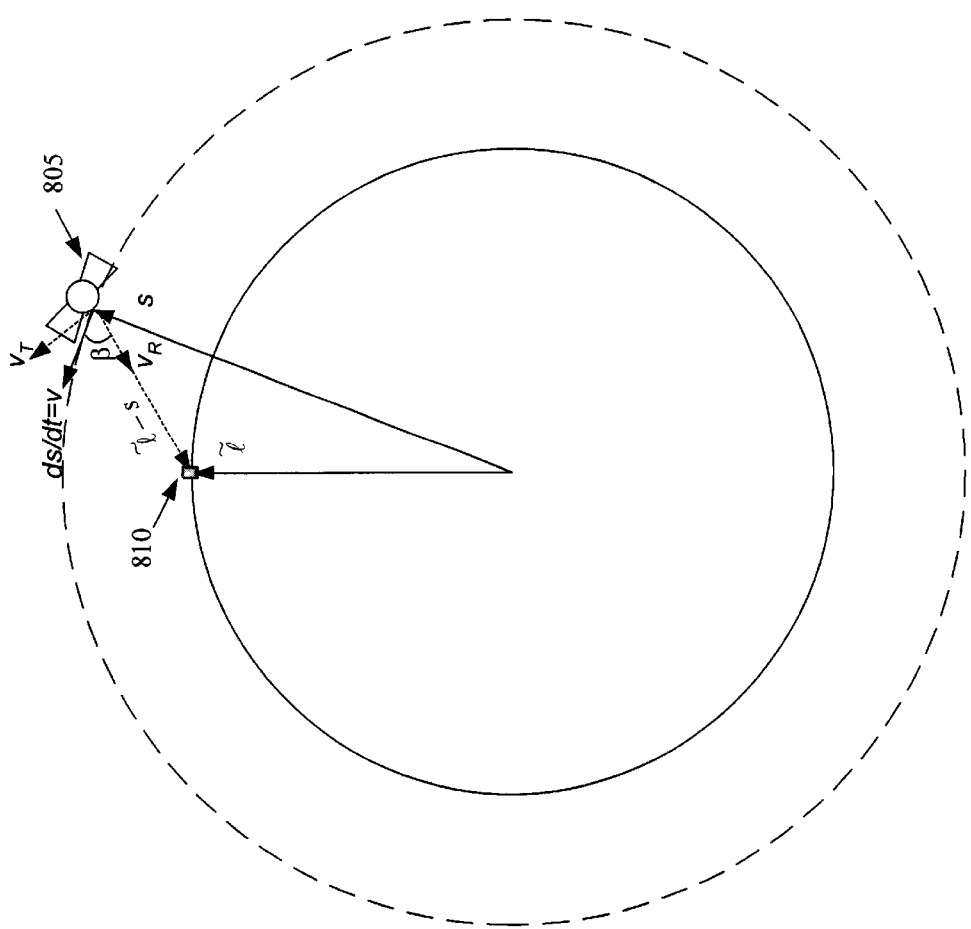
FIG. 8 illustrates how a satellite's speed towards an approximate location is computed from the satellite's overall speed.

FIG. 8 illustrates how the satellite's speed towards the approximate location $\hat{l}$ can be computed from the satellite's overall speed. This figure illustrates a satellite 805 that is over an approximate location 810. The position of this satellite is defined by a position vector s, and the velocity of this satellite is defined by a velocity vector v, which is a derivative of the position vector s (i.e., v=ds/dt). Some embodiments compute this velocity vector mathematically from the position vector. For instance, some embodiments compute the derivative of the position vector by (1) calculating the satellite positions at beginning and end of a short time period, (2) calculating the difference in the satellite positions, and (3) dividing this difference by the time period. Under this approach, the satellite positions can be calculated according to the equations provided in Table 2.3 on page 38 of "Understanding GPS Principles and Applications," by Elliott Kaplan, Artech House, 1996.

The direction from the satellite to the approximate location is defined by a vector $(\hat{l}-\tilde{s})/\|\hat{l}-\tilde{s}\|$, which is the difference between the approximate location vector $\hat{l}$ and the satellite position vector s, normalized by the magnitude of the difference. The satellite's speed $v_R$ in this direction equals the inner product of the satellite's overall speed v with this direction. Hence, the desired speed is calculated according to Equation (3) below.

$$v_R = \frac{v'(\hat{l}-\tilde{s})}{\|\hat{l}-\tilde{s}\|} \quad (3)$$

Therefore, at 710, the process 700 uses Equation (3) to compute the speed of the selected overhead satellite towards the approximate location $\hat{l}$.

At 715, the process then defines the additive Doppler-shift value $f_i$ for the selected satellite i by using Equation (4) below.

$$f_i = \frac{v_R}{c} f_{RF} \quad (4)$$

In this equation, c is the speed of light and $f_{RF}$ is the GPS carrier frequency.

At 720, the process determines whether it has generated additive Doppler-shift values for all the overhead GPS satellites on its list of overhead GPS satellites. If not, the process returns to 705 to select another GPS satellite from this list, and repeats the above-described operations in order to generate the additive Doppler-shift value for the newly-selected satellite. Once the process determines (at 720) that it has generated additive Doppler-shift values for all the overhead GPS satellites, the process ends.

D. Identification of a Region

After computing the additive Doppler-shift values for all overhead satellites, the process 200 identifies (at 220) a region around the approximate location. As further described below, the process searches through this region to estimate the location of the GPS receiver.

Figure 10:
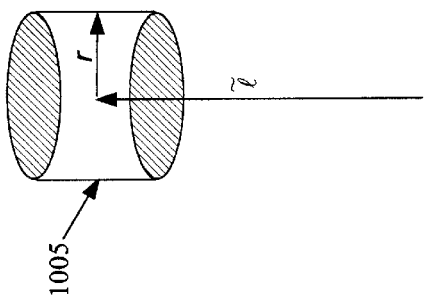
FIGS. 9–11 illustrate three types of regions that are examined in some embodiments of the invention.
Figure 11:
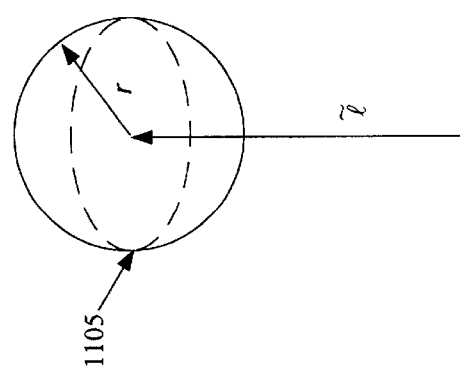
Figure 9:
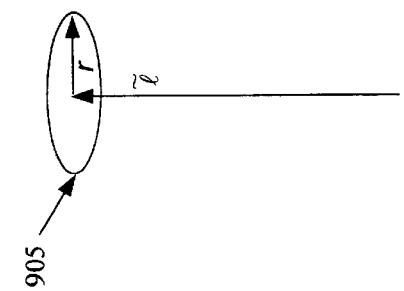

FIGS. 9–11 illustrate three-types of regions that the process 200 searches in different embodiments of the invention. As shown in FIG. 9, in some embodiments, the process identifies a circular region 905 around the approximate location $\hat{l}$. Such a region can be defined by a vector r normal to the approximate location vector $\hat{l}$.

FIG. 10 illustrates a cylindrical region 1005 that the process can identify around the approximate location $\hat{l}$. Such a cylinder can be identified by defining regions above and below the circular region 905. Alternatively, FIG. 11 illustrates a spherical region 1105 that the process can identify around the approximate location $\hat{l}$. Such a region can be defined by a vector r with a particular magnitude that represents the radius of the sphere.

Some embodiments identify the regions (e.g., the circular, cylindrical, or spherical regions) around the approximate location by retrieving from a storage structure information about this region. For instance, some embodiments store information about the region surrounding each base station tower (i.e., each potential approximate location). When the location-determination server 300 receives signals from a particular base station, these embodiments then retrieve from storage the information about the region surrounding the location of the particular base station's tower. Some embodiments index the storage structure (i.e., search and retrieve location and region information from the storage structure) by using the base station's tower identification.

E. Estimation of the GPS-Receiver Location

After identifying the region for the GPS receiver, the process 200 estimates (at 225) the location of the GPS receiver in this region. The embodiments described below estimate the GPS-receiver location by initially selecting a number of candidate locations within the region. For each particular selected location, these embodiments calculate a metric function M that quantifies the similarity between the GPS reference data and samples of the signal that the receiver would be expected to receive at the particular location. These embodiments then identify the location that resulted in the best calculated metric value as the location of the GPS receiver.

Some embodiments calculate the metric value M not only over a set of candidate locations within the region but also over a set of candidates for other unknown parameters. For instance, some embodiments calculate the metric value M as a function of the following five unknown parameters: (1) $\hat{l}$, which represents a vector specifying a candidate location within the region, (2) $\hat{t}_1$, which represents a candidate first-sample time, (3) $\hat{\alpha}$, which represents a N-value vector of candidate power levels for the received signals from the N overhead satellites, (4) $\hat{\phi}$, which represents a N-value vector of candidate carrier phases of the signals from the N overhead satellites, and (5) $\hat{f}_O$, which represents a candidate value for a Doppler-shift introduced in the received signal due to the receiver clock's drift.

In this document, a "hat" is placed over a variable to indicate that the value of the variable is a candidate value in a range of values for the variable. Also, the metric value M is calculated as a function of a variable first-sample time $\hat{t}_1$ in order to account for inaccuracies in the receiver clock. In addition, as mentioned above, the metric value M is calculated as a function of the Doppler-shift $\hat{f}_O$ in order to account for the receiver clock's drift $D^c$ (e.g., drift due to temperature, etc.).

Some embodiments calculate the metric value M by initially enumerating a set of candidates for each variable $\hat{l},\hat{t}_1,\hat{\alpha},\hat{\phi},\hat{f}_O$. Each combination of candidate values (i.e., each combination of a particular candidate $\hat{l}$, candidate $\hat{t}_1$, candidate $\hat{\alpha}$, candidate $\hat{\phi}$, and candidate $\hat{f}_O$) represents a hypothesis $\hbar$ about the true values of the parameters $l,t_1,\alpha,\phi,f_O$.

For each hypothesis $\hbar$ (i.e., for each hypothetical set of candidate values $\hat{l},\hat{t}_1,\hat{\alpha},\hat{\phi},\hat{f}_O$) and each overhead satellite i, these embodiments compute a hypothetical signal $r_i\hbar$ that represents the signal (without noise) that the GPS receiver is expected to receive from the satellite i when the hypothesis is true (i.e., when the hypothetical set of candidate values $\hat{l},\hat{t}_1,\hat{\alpha},\hat{\phi},\hat{f}_O$ are the actual values of their corresponding variables). The modeling of the hypothetical reference signals ($r_i\hbar$'s) will be further explained below in sub-section 1.

For each hypothesis $\hbar$, these embodiments then calculate a metric value M. The metric value for a hypothesis $\hbar$ quantifies the similarity between the received GPS reference signal and the hypothetical signals (i. e., the $r_i\hbar$'s) that the receiver is expected to receive from all the overhead satellites if the hypothesis $\hbar$ is true. These embodiments then identify the location that resulted in the best calculated metric value as the location of the GPS receiver.

To calculate the metric value M for each hypothesis $\hbar$, some embodiments sum the generated hypothetical signals $r_i\hbar$'s, sample the summed signal, and compare the sampled sum with the received GPS reference data. Other embodiments calculate the metric value M for each hypothesis $\hbar$ by sampling each generated hypothetical signal (i. e., each $r_i\hbar$), comparing each generated sample with the GPS reference data, and combining (e.g., summing) the results of the comparisons.

Different embodiments of the invention use different metric functions. Some embodiments calculate the difference between the received GPS reference signal and the hypothetical signals (i.e., the $r_i\hbar$'s) that the receiver is expected to receive from all the overhead satellites if the hypothesis $\hbar$ is true. To calculate this difference, different embodiments use different differencing functions. For instance, some embodiments use the differencing function $\delta$ illustrated in Equation (5) below.

$$M = \delta(\hat{l}, \hat{t}_1, \hat{\alpha}, \hat{\phi}, \hat{f}_O) = \sum_{k=1}^{K} (x_k - r_k^\hbar)^2 \quad (5)$$

In this equation, the variable $x_k$ represents a sample of the GPS reference data. The variable $r_k\hbar$ represents a sample of an aggregate hypothetical reference signal combining components corresponding to all the overhead satellites. In other words, the differencing equation (5) calculates a difference value for a particular hypothesis $\hbar$ by first summing the generated hypothetical signals $r_i\hbar$ of all satellites, generating samples $r_k\hbar$ of the summed signal, subtracting each generated sample from the corresponding sample in the received GPS reference data, squaring the resulting subtractions, and adding the resulting squared values.

Another approach for calculating a difference value for a hypothesis $\hbar$ samples the generated hypothetical signal $r_i\hbar$ for each satellite, subtracts the samples of each satellite's hypothetical signal from the received GPS reference data, and then combines (e.g., sums) the results of the differencing operation for each satellite. One manner of implementing this approach is given by the following differencing function:

$$M = \delta(\hat{l}, \hat{t}_1, \hat{\alpha}, \hat{\phi}, \hat{f}_O) = \sum_{i=1}^{N} \sum_{k=1}^{K} (x_k - r_{i,k}^\hbar)^2.$$

Under either approach, the generated difference value quantifies the difference between the received signal and the signal that the GPS-receiver is expected to received if the hypothesis is true. The best difference value is the smallest value. Hence, the embodiments that calculate the differencing metric search through the candidate space, in order to find the hypothesis that minimizes this metric or one that makes this metric small.

Some embodiments use a log-likelihood ratio as their metric function. For instance, the embodiments described below use a log-likelihood ratio provided by Equation (6) below.

$$M = L(\hat{l}, \hat{t}_1, \hat{\alpha}, \hat{\phi}, \hat{f}_O) = \sum_{k=1}^{K} x_k r_k^\hbar - \frac{1}{2} \sum_{k=1}^{K} r_k^\hbar r_k^\hbar \quad (6)$$

Maximizing this function is equivalent to minimizing the differencing function $\delta$ of Equation (5). In particular, the log-likelihood ratio is obtained from the differencing function by (1) reducing $(x_k - r_k\hbar)^2$ to the polynomial expression $(x_k^2 - 2x_k r_k\hbar + (r_k\hbar)^2)$, (2) discarding the $x_k^2$ term, and (3) multiplying the remaining two terms by $-\frac{1}{2}$. In Equation (6), the variable $x_k$ represents a sample of the GPS reference data, and the variable $r_k\hbar$ represents the sample of an aggregate hypothetical reference signal for all the overhead satellites. In other words, the log-likelihood-ratio equation (6) calculates a log-likelihood ratio for a particular hypothesis $\hbar$ by first summing the generated hypothetical signals $r_i\hbar$ of all satellites, generating samples $r_k\hbar$ of the summed signal, correlating the samples with the received GPS reference data, and then subtracting the correlation of $r_k\hbar$ with itself.

Another approach that calculates a proxy to the aforementioned log-likelihood ratio for a hypothesis $\hbar$ samples the generated hypothetical signal $r_i\hbar$ for each satellite, correlates the samples of each satellite's hypothetical signal with the received GPS reference data, and then combines (e.g., sums) the results of the correlation operations. One manner of implementing this approach is given by the following equation:

$$M = L(\hat{l}, \hat{t}_1, \hat{\alpha}, \hat{\phi}, \hat{f}_O) = \sum_{i=1}^{N} \sum_{k=1}^{K} x_k r_{i,k}^\hbar.$$

Under either approach, the best generated log-likelihood ratio is the largest value, as indicated by Equation (7) below.

$$\max_{\hat{l},\hat{t}_1,\hat{\alpha},\hat{\phi},\hat{f}_O} L(\hat{l}, \hat{t}_1, \hat{\alpha}, \hat{\phi}, \hat{f}_O). \quad (7)$$

Hence, the embodiments that calculate the log-likelihood ratio search through the candidate space, in order to find the set of candidates that maximizes this value or that makes this value large. The location of the hypothesis $\hat{h}$ that results in the maximum log-likelihood ratio is the estimated location of the GPS receiver.

The maximization process can be broken down into two separate maximization processes, as indicated below.

$$\max_{\hat{l},\hat{t}_1,\hat{f}_O} \max_{\hat{\alpha},\hat{\phi}} L(\hat{l}, \hat{t}_1, \hat{\alpha}, \hat{\phi}, \hat{f}_O). \quad (8)$$

Hence, some embodiments perform this maximization operation in two loops: (1) an outer loop that searches and selects $\hat{l},\hat{t}_1,\hat{f}_O$, and (2) an inner loop that computes the log-likelihood ratio L for the selected $\hat{l},\hat{t}_1,\hat{f}_O$ and their corresponding optimal values of $\hat{\alpha},\hat{\phi}$. Some embodiments that use this two-loop approach make certain approximations in modeling the hypothetical GPS reference signals $r_i\hat{h}$. One model for the hypothetical reference signals is explained below in sub-section 1.

1. Modeling Hypothetical Reference Signals

As mentioned above, the location-determination server 300 receives from a reference GPS receiver the navigation bits of each satellite as a function of GPS time. Accordingly, this server can reproduce the signal transmitted by each satellite. The signal transmitted by the i-the satellite at time t is given (within a constant multiplicative factor that reflects transmitter power) by $$a_i(t)=\bar{\xi}_i(t)\cos(2\pi(f_{RF}t+\phi_i^{(1)})), \quad (9)$$

where $$\bar{\xi}_i(t)=v_i(t)\zeta_i(t) \quad (10)$$

is the "baseband" signal of satellite i. In Equations (9) and (10), $v_i(t)$ is the value of the navigation bit as a function of GPS time, $\zeta_i(t)$ is the PRN process (code) of satellite i, $\phi_i^{(1)}$ is the carrier phase of the satellite upon transmission, and $f_{RF}$ is the GPS frequency.

The GPS receiver receives a linear combination of the signals from the N overhead satellites plus noise. The signal transmitted by satellite i incurs a delay $H(\hat{l},s_i)$ as discussed in section II.A, and the received signal is of the form $$a_i(t-H(\hat{l},s_i))=\hat{\alpha}_i\bar{\xi}_i(t-H(\hat{l},s_i))\cos(2\pi((f_{RF}+f_i)t+\phi_i^{(2)})) \quad (11)$$

where $\hat{\alpha}_i$ stands for the received power.

Before sampling, the receiver performs bandpass filtering and mixing on the received signal. These two operations are linear operations. Hence, these operations act separately on the parts of the received signal originating from different satellites. The objective of mixing is to change the carrier frequency $f_{RF}$ in the cosine term in Equation (11), from $f_{RF}$ to an intermediate frequency $f_{IF}$. However, the Doppler effect due to the movement of the satellites reflects itself in a (known) frequency error of $f_i$. Furthermore, the inaccuracies in the receiver clock that drives the mixer reflect themselves in an additional frequency error of $f_o$.

For these reasons, the term $$\cos(2\pi((f_{RF}+f_i)t+\phi_i^{(2)}))$$

is replaced by $$\cos(2\pi((f_{IF}+f_i+\hat{f}_o)t+\phi_i^{(3)})).$$

The effect of bandpass filtering can be approximated by lowpass filtering the baseband transmitted signal $\bar{\xi}_i(t)$. Therefore, $\bar{\xi}_i(t)$ is to be replaced by $$\xi_i(t)=(g*\bar{\xi}_i)(t),$$

where $g(.)$ is the impulse response of the lowpass filter and "*" denotes convolution.

To summarize, the part of the received signal that is due to satellite i, just before sampling, can be modeled in the form $$\hat{\alpha}_i\xi_i(t-H(\hat{l},s_i))\cos(2\pi((f_{IF}+f_i+\hat{f}_o)t+\phi_i^{(3)})).$$

By suitably redefining the carrier phase, we arrive at a final model of the form $$\hat{\alpha}_i\xi_i(t-H(\hat{l},s_i))\cos(2\pi((f_{IF}+f_i+\hat{f}_o)(t-\hat{t}_1)+\hat{\phi}_i)),$$

where $\hat{t}_1$ is the hypothesized time at which the first sample was received.

According to the above description, the equations below summarize (1) a model that can be used to represent hypothetical reference signals $r_i\hat{h}$ for hypothetical sets of candidate values, (2) a resulting model for the samples of the received signal under a hypothetical set of candidate values, and (3) the resulting formula for the log-likelihood ratio under a particular hypothesis.

PRN code, together with navigation bits:

$$\bar{\xi}_i(t)=v_i(t)\zeta_i(t). \quad (12)$$

Lowpass filtering:

$$\xi_i(t)=(g*\bar{\xi}_i)(t). \quad (13)$$

Time shifting and modulation by a cosine:

$$r_i^{pullout;zu838200.900}(t)=\xi_i(t-H(\hat{l},s_i))\cos(2\pi(f_{IF}+\hat{f}_o+f_i)(t-\hat{t}_1)+\hat{\phi}_i)). \quad (14)$$

Contributions of satellite i to the generated hypothetical signal:

$$\hat{\alpha}_ir_i^{pullout;zu838200.900}(t)=\hat{\alpha}_i\xi_i(t-H(\hat{l},s_i))\cos(2\pi(f_{IF}+\hat{f}_o+f_i)(t-\hat{t}_1)+\hat{\phi}_i)) \quad (15)$$

Adding the contributions of the various satellites:

$$r^{\hat{h}}(t)=\sum_{i=1}^{N}\hat{\alpha}_ir_i^{\hat{h}}(t). \quad (16)$$

Sampling:

$$r_k^{pullout;zu838200.900}=r^{pullout;zu838200.900}(\hat{t}_1+(d-1)\Delta) \quad (17)$$

$$r_{i,k}^{pullout;zu838200.900}=r_i^{pullout;zu838200.900}(\hat{t}_1+(k-1)\Delta) \quad (18)$$

Likelihood computation:

$$L(\hat{h})=\sum_{K}\backslash(\backslash\%\backslash)x_kr_k^{\hat{h}}-\frac{1}{2}\sum_{K}r_k^{\hat{h}}r_k^{\hat{h}} \quad (19)$$

$$L(\hat{h})=\sum_{k=1}^{K}x_k\sum_{i=1}^{N}\hat{\alpha}_ir_{i,k}^{\hat{h}}-\frac{1}{2}\sum_{k=1}^{K}\left(\sum_{i=1}^{N}\hat{\alpha}_ir_{i,k}^{\hat{h}}\sum_{j=1}^{N}\hat{\alpha}_jr_{j,k}^{\hat{h}}\right) \quad (20)$$

$$L(\hbar) = \sum_{i=1}^{N} \hat{\alpha}_i \sum_{k=1}^{K} x_k r_{i,k}^{\hbar} - \frac{1}{2} \sum_{i=1}^{N} \sum_{j=1}^{N} \hat{\alpha}_i \hat{\alpha}_j \sum_{k=1}^{K} r_{i,k}^{\hbar} r_{j,k}^{\hbar} \qquad (21)$$

Some embodiments calculate the log-likelihood ratio $L(\hbar)$ of a particular hypothesis $\hbar$ by first summing the generated hypothetical signals $r_i\hbar$ of all satellites, sampling the summed signal, and then correlating the sampled sum with the received GPS reference data. Some of these embodiments respectively use Equations (14), (16), and (17) to model the hypothetical signal $r_i\hbar$ from each satellite, the aggregate hypothetical signal $r\hbar$, and the sampled aggregate signal $r_k\hbar$, and then use Equation (20) to calculate the log-likelihood ratio $L(\hbar)$.

The embodiments described in sub-section 3 below, however, calculate the log-likelihood ratio $L(\hbar)$ of a hypothesis $\hbar$ by sampling each generated hypothetical signal (i.e., each $r_i\hbar$). correlating (i.e., multiplying) each generated sample with the GPS reference data, and combining (e.g., summing) the results of the correlation. Some of these embodiments respectively use Equations (14) and (18) to model the hypothetical signal $r_i\hbar$ from each satellite and each sample $r_{i,k}\hbar$ of each hypothetical signal, and then use Equation (21) to calculate the log-likelihood ratio $L(\hbar)$.

The specific way of modeling $r\hbar$ that has been described above is but one way of generating a model of the hypothetical reference signal. One of ordinary skill will realize that different models of the hypothetical reference signal can be constructed in order to capture more or less detail. For instance, one model might omit the lowpass filtering operation. Another model might take into account changes to the signal-transit delay $H(l,s_i)$ due to the movement of the satellites, by partitioning samples into segments and applying a different delay $H(l,s_i)$ to each segment.

2. Log-Likelihood-Ratio-Computing Process

As mentioned above, some embodiments identify the GPS-receiver location as the location associated with the hypothesis $\hbar$ (i.e., of the sets candidate values $\hat{l},\hat{t}_1,\hat{\alpha},\hat{\phi},\hat{f}_O$) that maximizes the log-likelihood ratio expressed in Equation (21) above. In addition, as mentioned above in connection with Equation (8), some embodiments perform this identification by using a nested-loop, with an outer loop that searches and selects $\hat{l},\hat{t}_1,\hat{f}_O$, and an inner loop that computes the log-likelihood ratio L for the selected $\hat{l},\hat{t}_1,\hat{f}_O$ and their corresponding optimal values of $\hat{\alpha},\hat{\phi}$.

Figure 12:
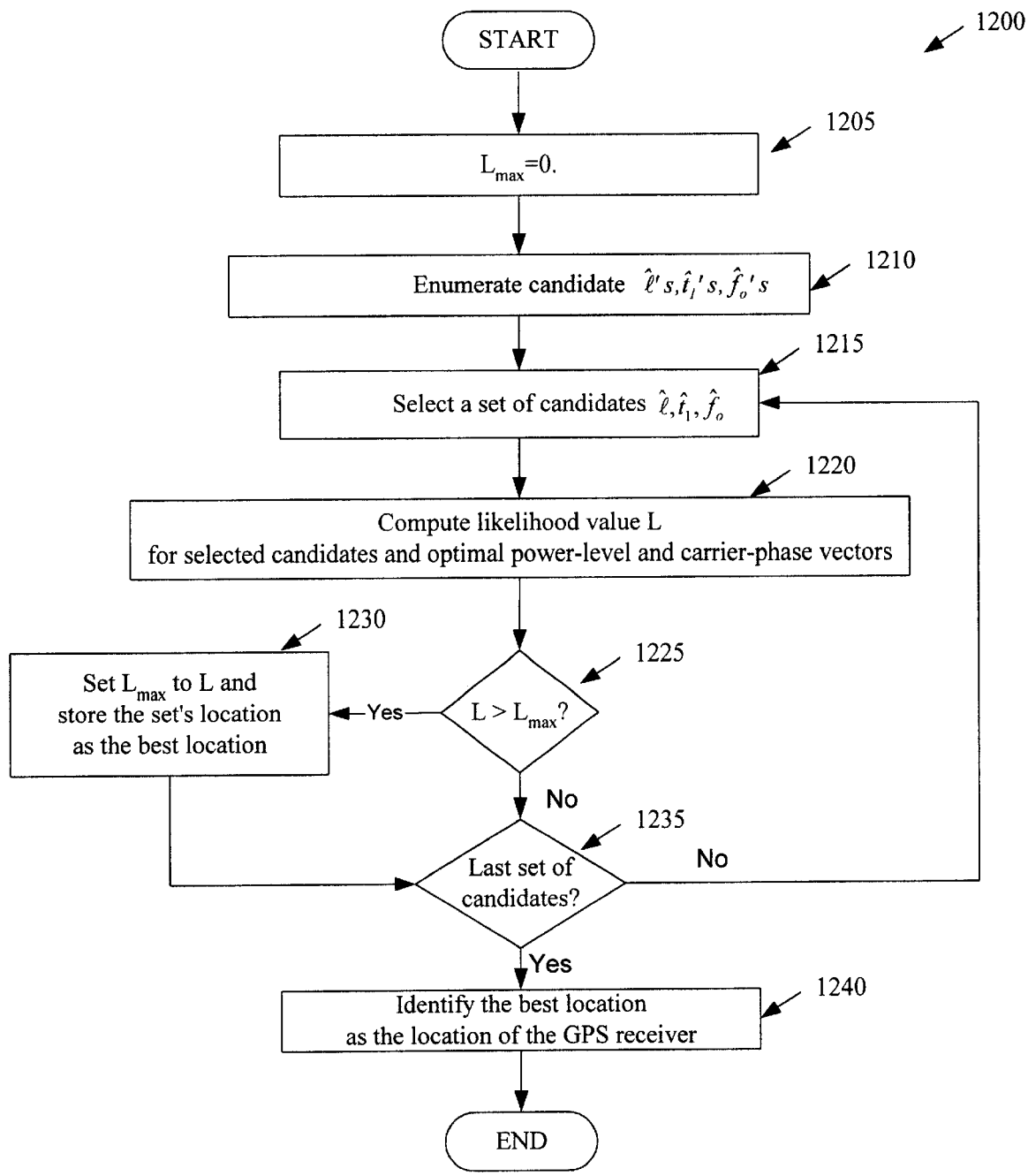
FIG. 12 illustrates a process for computing log-likelihood ratios for different hypotheses, and for identifying the location resulting in the maximum log-likelihood ratio.

FIG. 12 illustrates a process 1200 that uses such a nested-loop approach. The process 1200 starts (at 1205) by initializing a variable $L_{MAX}$ to zero. Next, the process enumerates (at 1210) a number of discrete candidates for the location vector $\hat{l}$, the first-sample time $\hat{t}_1$, and the additive clock Doppler shift $\hat{f}_O$. To enumerate candidate location vectors, some embodiments impose grids over the region identified at 220. Some embodiments use coarser grids than others to define candidate locations in the identified region.

After enumerating the candidate location vectors $\hat{l}$'s, first-sample times $\hat{t}_1$'s, and additive clock Doppler shifts $\hat{f}_O$'s, the process 1200 selects (at 1215) one set of candidates $\hat{l},\hat{t}_1,\hat{f}_O$ (i.e., one candidate location vector $\hat{l}$, one first-sample time $\hat{t}_1$, and one additive clock Doppler shift $\hat{f}_O$). Next, the process performs (at 1220) the inner loop of nested-loop process of Equation (8). Specifically, at 1220, the process computes the log-likelihood ratio L for the selected $\hat{l},\hat{t}_1,\hat{f}_O$ and their optimal power vector $\hat{\alpha}$ and carrier-phase vector $\hat{\phi}$.

Sub-section 3 below describes one approach for performing the inner loop without searching through the power and phase candidate space to find the optimal power and phase vectors. As further described below, this approach introduces two new variables that make the log-likelihood ratio into a quadratic function, and then sets the derivative of this quadratic function to zero in order to obtain the optimal values for the new variables. For these optimal values, the log-likelihood ratio L is then calculated based on (1) the GPS signal snapshot, and (2) the corresponding snapshot of the hypothetical signal that the receiver would receive if the current hypothesis was true and there was no noise.

After computing the log-likelihood ratio L for the selected $\hat{l},\hat{t}_1,\hat{f}_O$ and their optimal power vector $\hat{\alpha}$ and carrier-phase vector $\hat{\phi}$, the process next determines (at 1225) whether the log-likelihood ratio L for the selected candidates is greater than the variable $L_{MAX}$. If so, the current candidates have resulted in the maximum log-likelihood ratio computed thus far. Consequently, the process stores (at 1230) the current candidates as the best candidates, defines the log-likelihood ratio L as the maximum log-likelihood ratio $L_{MAX}$, and transitions to 1235, which is explained below.

If the process determines (at 1225) that the log-likelihood ratio L for the selected candidates is not greater than $L_{MAX}$, the process transitions to 1235. At 1235, the process determines whether it has gone through all combinations of enumerated candidate location vectors $\hat{l}$'s, first-sample times $\hat{t}_1$'s, and clock Doppler shifts $\hat{f}_O$'s. If not, the process transitions back to 1215 to select another set of candidates $\hat{l},\hat{t}_1,\hat{f}_O$, and to repeat the above-described operations for the newly selected candidates.

When the process determines (at 1235) that it has examined all the combinations of enumerated candidate location vectors $\hat{l}$'s, first-sample times $\hat{t}_1$'s, and clock Doppler shifts $\hat{f}_O$'s, the process identifies (at 1240) the location l of the best set of candidates (recorded at 1230) as the estimated location of the GPS receiver. The process then ends.

3. Performing the Inner Loop

One manner for performing (at 1220) the inner loop of nested-loop process of Equation (8) will now be described. By the time the process 1200 reaches 1220, it has selected a set of candidates $\hat{l},\hat{t}_1,\hat{f}_O$. Hence, these three variables are treated as known, fixed variables in the discussion below.

Some embodiments perform the inner loop by using a set of equations that are derived from Equation (21) described above. This set of equations includes Equations (26)–(32), which are described below. However, before describing these equations, the derivation of these equations will be initially explained.

a. Derivation of Equations (26)–(32)

To derived Equations (26)–(32), a new set of variables is introduced. These variables are:

$$\hat{A}_i = \hat{\alpha}_i \cos 2\pi\hat{\phi}_i, \qquad (22)$$

$$\hat{B}_i = \hat{\alpha}_i \sin 2\pi\hat{\phi}_i, \qquad (23)$$

These variables are introduced because they reduce the Equation (21) into a quadratic function of these new variables. This quadratic function can be optimized by setting its derivative to zero and then solving the resulting system of 2N equations with 2N unknowns. Hence, this quadratic function provides a way of maximizing the log-likelihood ratio over power levels and carrier phases without searching through the power and phase candidate space.

Specifically, the contribution of each the i-th overhead satellite to the generated hypothetical signal can be reformulated by substituting variables $\hat{A}_i$ and $\hat{B}_i$ in Equation (15) to obtain Equation (24) below.

$$\hat{\alpha}_i r_i^h(t) = \hat{\alpha}_i \xi_i(t - H(\hat{l}, s_i)) \cos(2\pi(f_{IF} + \hat{f}_o + f_i)(t - \hat{t}_1) + \hat{\phi}_i)) \quad (24)$$

$$= \hat{A}_i \xi_i(t - H(\hat{l}, s_i)) \cos(2\pi(f_{IF} + \hat{f}_o + f_i)(t - \hat{t}_1)) -$$

$$\hat{B}_i \xi_i(t - H(\hat{l}, s_i)) \sin(2\pi(f_{IF} + \hat{f}_o + f_i)(t - \hat{t}_1))$$

To make the dependence on time clearer, the notation can be changed. By defining $\Theta$ to be the length of the PRN code before it repeats (the PRN code typically repeats every 1 ms), the hypothesized time $\hat{t}_k$ of the k-th sample can be represented as:

$$\hat{t}_k = \Theta\hat{\vartheta}_i + \hat{\sigma}_i + \Delta(k-1) + H(\hat{l}, s_i), \quad (25)$$

where $\hat{\vartheta}_i$ is a positive integer representing the hypothesized number of PRN code cycles since the nominal 0 GPS time for satellite i, and $\hat{\sigma}_i$ is a real number in the range $$\left[-\frac{\Theta}{2}, \frac{\Theta}{2}\right]$$

representing the code phase offset that is hypothesized for the first sample. The $\hat{\vartheta}_i$ specifies whether or not the navigation bit can change since it identifies the place in the transmission for the given satellite. Since the PRN code repeats, the start (i.e., where the code phase $\hat{\sigma}_i = 0$) is identified with the point in the signal at which a navigation bit change can cause the sense to flip.

By defining the following I and Q components, $$I_{0,i} = \sum_{k=1}^{K} x_k \xi_i(\Theta\hat{\vartheta}_i + \hat{\sigma}_i + \Delta(k-1)) \cos(2\pi(f_{IF} + \hat{f}_o + f_i)\Delta(k-1)) \quad (26)$$

$$Q_{0,i} = \sum_{k=1}^{K} x_k \xi_i(\Theta\hat{\vartheta}_i + \hat{\sigma}_i + \Delta(k-1)) \sin(2\pi(f_{IF} + \hat{f}_o + f_i)\Delta(k-1)) \quad (27)$$

$$I_{i,j} = \sum_{k=1}^{K} \xi_i(\Theta\hat{\vartheta}_i + \hat{\sigma}_i + \Delta(k-1)) \quad (28)$$

$$\xi_j(\Theta\hat{\vartheta}_j + \hat{\sigma}_j + \Delta(k-1)) \cos(2\pi(f_i - f_j)\Delta(k-1))$$

$$Q_{i,j} = \sum_{k=1}^{K} \xi_i(\Theta\hat{\vartheta}_i + \hat{\sigma}_i + \Delta(k-1)) \quad (29)$$

$$\xi_j(\Theta\hat{\vartheta}_j + \hat{\sigma}_j + \Delta(k-1)) \sin(2\pi(f_i - f_j)\Delta(k-1))$$

the log-likelihood ratio can be well approximated by $$L = \sum_{i=1}^{N} (A_i I_{0,i} - B_i Q_{0,i}) - \quad (30)$$

$$\frac{1}{4} \sum_{i=1}^{N} \sum_{j=1}^{N} [(A_j A_i + B_i B_j) I_{i,j} + (B_j A_i - A_j B_i) Q_{i,j}].$$

Equation (30) is a quadratic function in terms of the variables $\hat{A}_i$ and $\hat{B}_i$. By setting the derivative of this equation to zero, we obtain the following system of equations for every $k \leq N$:

$$I_{0,k} = \frac{1}{4} \sum_i A_i(I_{i,k} + I_{k,i}) + B_i(Q_{k,i} - Q_{i,k}) \quad (31)$$

$$-Q_{0,k} = \frac{1}{4} \sum_i B_i(I_{i,k} + I_{k,i}) + A_i(Q_{i,k} - Q_{k,i}) \quad (32)$$

This derivative can be solved as a system of 2N equations with 2N unknowns, in order to obtain the optimal values for these variables $\hat{A}_i$ and $\hat{B}_i$.

b. Computation of the Log-Likelihood Ratio

To compute the log-likelihood ratio for each set of candidate $\hat{l}, \hat{t}_1, \hat{f}_o$, the I and Q components are first calculated based on Equations (13) and (26)–(29). Next, the optimal values for variables $\hat{A}_i$ and $\hat{B}_i$ are computed by solving Equations (31)–(32) above. Finally, the log-likelihood ratio is calculated by using the computed I and Q components and the computed $\hat{A}_i$ and $\hat{B}_i$ variables in Equation (30).

One of ordinary skill will realize that the above-described embodiments have several advantages. For instance, these embodiments do not perform triangulation operations that require strong signals from three or more satellites. Rather, they perform their position-detection operations by analyzing the data with respect to all the satellites that can influence this data.

Analyzing the contribution of all possible satellites improves the sensitivity of these embodiments. This improved sensitivity is especially beneficial in environments (e.g., indoors or under foliage) where the satellite signals are attenuated. In other words, these embodiments can tolerate greater signal attenuation than traditional GPS techniques, and thereby can perform location determination in environments that would cause traditional GPS techniques to fail.

Even in environments where the satellite signals are not greatly attenuated, analyzing the contribution of all possible satellites is advantageous in that it reduces the amount of data (i.e., the number of samples) that these embodiments need to consider in order to obtain comparable results to traditional GPS techniques. This analysis considers the code phases of the GPS satellites together. Hence, such analysis would not consider code phase candidate combinations that are impossible, and is thereby more efficient statistically.

Also, analyzing the contribution of all possible satellites allows the inter-satellite interference to be discounted from the location-determination computations, which, in turn, allows the location to be more accurately estimated. For instance, in the log-likelihood ratio Equations (20) and (21), the inter-satellite interference corresponds to the second term in these equations, and it is subtracted from the first terms of these equations; in these equations, the first terms provide the inner-product between the received GPS reference data and samples of the hypothetical reference signals.

While the invention has been described with reference to numerous specific details, one of ordinary skill in the art will recognize that the invention can be embodied in other specific forms without departing from the spirit of the invention. For instance, as described above, the location-determination process 200 (1) selects a number of locations within a region that contains the GPS receiver, (2) for each particular selected location, calculates a metric value that quantifies the similarity between the GPS reference data and the signal that the receiver could expect to receive at the particular selected location, and (3) estimates the location of the GPS receiver based on the calculations.

One of ordinary skill will realize, however, that other embodiments estimate the GPS-receiver location in a different manner. For instance, one embodiment selects one location at a time, calculates the metric value for the selected location, and compares the calculated metric value with a threshold value. If the calculated metric value is better than the threshold value, this embodiment identifies the selected location as the estimated GPS-receiver location. Otherwise, this embodiment continues to select locations within the region containing the GPS-receiver until one of the locations results in a metric value that is better than the threshold value. Different embodiments define the threshold value differently. In some embodiments, this value is dependent on the environment, while in other embodiments this value is dependent on certain statistics regarding the received signal.

Also, even though the embodiments described above use the commercial GPS frequency, other embodiments use the military GPS frequency, while others use both the military and commercial frequencies. Thus, one of ordinary skill in the art will understand that the invention is not to be limited by the foregoing illustrative details, but rather is to be defined by the appended claims.

We claim:

1. A method of determining an estimated location of a receiver within a region from a reference signal received by the receiver, the method comprising:
    a) selecting a plurality of locations within the region;
    b) for each selected location, calculating a metric value that quantifies the similarity between the received signal and an expected signal for the selected location; and
    c) identifying the estimated location of the receiver based on the calculations.

2. The method of claim 1 wherein identifying the estimated location of the receiver comprises:
    a) identifying the metric value that is the best value among the calculated metric values; and
    b) identifying the location resulting in the best metric value as the estimated location of the receiver.

3. The method of claim 1, wherein calculating the metric value for each selected location comprises calculating the difference between the received signal and the expected signal for the selected location.

4. The method of claim 3, wherein identifying the estimated location includes identifying the selected location resulting in the smallest calculated difference as the estimated location of the receiver.

5. The method of claim 1, wherein calculating the metric value for each selected location comprises calculating a log-likelihood ratio based on the received signal and the expected signal for the selected location.

6. The method of claim 5, wherein identifying the estimated location includes identifying the selected location resulting in the maximum calculated log-likelihood ratio as the estimated location of the receiver.

7. The method of claim 1 identifying the estimated location includes:
    a) identifying the selected location that resulted in the best calculated metric value;
    b) selecting a plurality of additional locations about the identified location;
    c) for each particular additional location, calculating a metric value that quantifies the similarity between the received signal and the expected signal for the particular additional location; and
    d) based on the additional calculations, identifying the estimated location of the receiver.

8. The method of claim 1, wherein identifying the estimated locations comprises:
    a) identifying a plurality of the selected locations that resulted in the best calculated metric values; and
    b) using an analytical technique to compute the estimated location from the identified selected locations.

9. The method of claim 8, wherein the analytical technique is an interpolative technique.

10. The method of claim 1, wherein the method is for a location-determination system having a plurality of transmitters and the receiver, wherein the expected signal is a signal that the receiver receives from a set of the transmitters.

11. The method of claim 10 further comprising:
    a) generating samples of the received signal;
    b) wherein calculating the metric value for the selected location comprises:
        1) generating an hypothetical signal for each transmitter in the set of transmitters;
        2) when the set of transmitters has more than one transmitter, combining the generated hypothetical signals to generate the expected signal;
        3) generating samples of the expected signal;
        4) calculating the metric value based on the samples of the received and expected signals.

12. The method of claim 10 further comprising:
    a) generating samples of the received signal;
    b) wherein calculating the metric value for the selected location comprises:
        1) generating an hypothetical signal for each transmitter in the set of transmitters;
        2) generating samples of each hypothetical signal;
        3) for each particular hypothetical signal, calculating a metric value based on the samples of the received signal and of the particular hypothetical signal to quantify the similarity between the received signal and the particular hypothetical signal; and
        4) when the set of transmitters has more than one transmitter, combining the calculated metric values for all hypothetical signals to generate the metric value for the selected location.

13. The method of claim 1, wherein the method is for a global positioning system ("GPS") and the receiver is a GPS receiver.

14. A global positioning method comprising:
    a) using a global positioning system ("GPS") receiver to receive a GPS signal; and
    b) identifying an estimated location of the GPS receiver from the GPS signal by comparing the received GPS signal with a synthesized GPS signal expected to be received at the estimated location.

15. For a global positioning system ("GPS") having a plurality of satellites, a method of estimating a location of a GPS receiver within a region from a GPS signal received by the receiver, the method comprising:
    a) identifying at least some of the satellites that are over the region;
    b) identifying a plurality of locations within the region;
    c) for each particular identified location, calculating a metric value that quantifies the similarity between the received GPS signal and an expected signal, the expected signal for each particular identified location is the signal that the receiver is expected to receive at the particular location from the identified satellites; and
    d) based on the calculations, estimating the location of the receiver.

16. The method of claim 15 wherein identifying the satellites comprises identifying all the satellites that are over the region.

17. The method of claim 15 wherein identifying the satellites comprises identifying some but not all of the satellites that are over the region.

18. The method of claim 15, wherein the received signal includes a signal from each of the identified satellites, the method further comprising:
   a) for each identified satellite, calculating a Doppler shift in the satellite's signal due to the motion of the satellite; and
   b) using the calculated Doppler shifts in the calculation of the metric value for each location.

19. The method of claim 15,
   wherein the metric value for each particular location is calculated by using a metric function that is dependent on an unknown parameter,
   wherein identifying the plurality of locations includes specifying a plurality of hypotheses, each hypothesis identifying a location within the region and a value for the unknown parameter; and
   wherein calculating the metric value for each particular location includes calculating, for each particular hypothesis, a metric value that quantifies the similarity between the received signal and an expected signal that the receiver is expected to receive from the identified satellites when the receiver is at the location specified by the particular hypothesis and the unknown parameter has the value specified by the particular hypothesis.

20. The method of claim 19, wherein the unknown parameter relates to operation of the GPS receiver.

21. The method of claim 20, wherein the receiver has a clock with a particular drift, wherein the clock's drift introduces a Doppler shift in the received signal, wherein the unknown parameter is the Doppler shift introduced by the clock's drift.

22. The method of claim 21 further comprising:
   generating samples of the received GPS signal, wherein a first sample is generated at a first-sample time measured according to the receiver's clock;
   wherein each hypothesis specifies a location, a Doppler-shift value, and a first-sample time value, and the calculated metric value for each hypothesis is a function of the location, Doppler-shift value, and first-sample time value specified by the hypothesis.

23. The method of claim 15 further comprising identifying the region containing the GPS receiver.

24. The method of claim 23 further comprising identifying an approximate location for the GPS receiver, wherein identifying the region includes identifying a region around the identified approximate location.

25. The method of claim 15, wherein calculating the metric value for each identified location comprises calculating the difference between the received GPS signal and the expected signal for the identified location.

26. The method of claim 15, wherein estimating the location of the receiver includes identifying the location resulting in the smallest calculated difference as the location of the receiver.

27. The method of claim 15, wherein calculating the metric value for each identified location comprises calculating a log-likelihood ratio based on the received GPS signal and the expected signal for the identified location.

28. The method of claim 27, wherein estimating the location of the receiver includes identifying the location resulting in the maximum calculated log-likelihood ratio as the location of the receiver.

29. The method of claim 14, wherein the comparing is performed quantitatively by evaluating a function.

30. The method of claim 29, wherein the function comprises a log-likelihood ratio.

31. The method of claim 29, wherein the function comprises a square of a difference between the received GPS signal and the synthesized GPS signal.

32. The method of claim 31, wherein the synthesized GPS signal is the sum of a plurality of GPS signals expected from a plurality of GPS satellites.

* * * * *